United States Patent [19]
Hindrichs

[11] 4,104,790
[45] Aug. 8, 1978

[54] PIPE INSTALLING APPARATUS FOR LARGE HEAT EXCHANGERS

[76] Inventor: Gerhard Hindrichs, Wuesterfeld 25b, Wuppertal, Fed. Rep. of Germany

[21] Appl. No.: 794,131

[22] Filed: May 5, 1977

[30] Foreign Application Priority Data

May 8, 1976 [DE] Fed. Rep. of Germany ....... 2620406

[51] Int. Cl.² ............................................ B23P 19/04
[52] U.S. Cl. ....................................... 29/707; 29/282; 29/726; 214/1 P
[58] Field of Search ................. 29/282, 726, 727, 707, 29/244; 214/1 P

[56] References Cited

U.S. PATENT DOCUMENTS

| 3,733,673 | 5/1973 | Young et al. | 29/727 X |
| 3,789,479 | 2/1974 | Zifferer et al. | 29/726 |
| 3,867,752 | 2/1975 | Tachibana et al. | 29/707 |
| 3,924,316 | 12/1975 | Matlock et al. | 29/726 X |

*Primary Examiner*—Victor A. DiPalma

[57] ABSTRACT

Mounting arrangement for insertion of tubes into tube plate apertures of the walls of large heat exchangers, especially in wide condensers and in large power plant coolers, comprising a cross slide device fitted with a thrust means, guiding channels aligned with apertures and a roller arrangement which are adapted to advance the tubes mounted by the apparatus.

8 Claims, 6 Drawing Figures

PIPE INSTALLING APPARATUS FOR LARGE HEAT EXCHANGERS

CROSS REFERENCE TO RELATED APPLICATIONS

Reference is made to West German application P 26 20 406.8 filed May 8, 1976 and priority under 35 USC 119 is claimed for this West German application.

BACKGROUND OF THE INVENTION

1a. Field of the Invention

This invention is in the field of mounting arrangements for inserting tubes into widely spaced end plates of large exchanges, condensers and coolers.

1b. Description of the Prior Art

In the construction of large heat exchange installations, for example, condensers and coolers used in large power plants, the insertions of the cooling tubes is very precise and expensive with regard to both the kind of labor and the cost of labor. Large condensers have two apertured end plates disposed at a wide distance of about 12 meters and these plates are provided with receiving holes for the tubes and the condenser is also provided with several supporting walls disposed between the end plates and these are also provided with the same perforation pattern as the end plates. The tubes are mounted from the direction of one of the outside surfaces of the end plates and the tubes are inserted through prealigned holes of the tube plates and of the intermediate supporting walls. In the case where manual labor is employed several mechanics have to be used at the same time. In view of the very large number of tubes that are to be inserted in the usual large condensers, generally up to about 80,000 tubes are provided — the insertion of the tube takes a great deal of manpower and is very strenuous. In this difficult type of mounting it is particularly critical that the tubes do not undergo unduly deep or somewhat spiralshaped scratches and running furrows or grooves as a result of insertion. This damage generally takes place at the not cleanly worked tube plates or at holes in the supporting wall, and may hardly be noticeable by the mechanics working manually, but may lead to premature corrosion damage in the case of relatively thin-walled cooling tubes and also leads to problems of sealing.

OBJECT OF THE INVENTION

The object of the invention is based on the task of creating a mounting arrangement for the insertion of tubes into the tube plates of heat exchange installations of the above described type by a machine, which reduces the danger of impermissible damage of the tubes during their insertion and which decreases the expenditure for supervisory personnel and labor.

SUMMARY OF THE INVENTION

To accomplish this object a mounting apparatus is provided according to the invention which is characterized by a cross slide arrangement which can be fixed on a tube plate of the heat exchange installation having a thrust assembly borne by the said cross slide arrangement. The thrust arrangement has one or several guide channels, alignable with the holes of the tube plate, for guiding the tubes that are to be inserted and is further provided with a driven pair of rollers for the feed of individual tubes. The mounting apparatus according to the invention results in a considerable relief in the labor requirement since the tubes need now to be pushed by only a short distance through guide channels of the thrust assembly right through the channels until they engage with the pair of driven rollers which take over. This job can be carried out by a single mechanic, who simply inserts the tubes in succession into all of the guide channels of the thrust assembly and who then turns on the roller driving motor, whereupon the additional tube through the condenser space takes place by the controlled rate of the driving machine. In this case, it is of particular advantage that the one or several tubes to be inserted remain constantly aligned with their hole in the tube plate during the entire insertion process as a result of which any groovings of the outside surface of the tubes are avoided to the greatest extent.

According to the invention, centering points are provided which are insertable into the advancing ends of the tubes which are assigned to the mounting apparatus. These centering points project from the ends of the tube with a conical point and facilitate the threading of the tubes into the hole of the supporting walls and of the opposite tube plate.

A preferred embodiment of the mounting apparatus is further characterized according to the invention by a control arrangement for the driving motor which is continuously adjustable to a maximum value and includes means for monitoring the amperage of the electric motor for driving the roller. The monitoring means comprises control switches for the driving motor and operates in the case of exceeding the maximum value to cause a reverse action of the motor. The maximum or border value for the motor has been found by experience and this value is synchronized with the maximum permissible degree of furrowing which is permitted under the requirements of the job. If furrowing occurs, then the feed resistance increases and the ampere absorption of the driving motor increases. In the case of an unduly strong furrowing, the border line amperage value is exceeded and the tubes are retracted to effectively cause a feed stop so that the mechanic is warned that a certain hole, in for example, one of the supporting walls, will have to be reworked (machined). The maximum permissible degree of furrowing is advantageously selected so low that a tube returned by the thrust aggregate may be used further.

Since the thrust assembly of the invention is mounted on a cross slide arrangement which is fixable on the tube plate, it may be easily adjusted and shifted to a subsequent group of holes after one tube insertion has been made; shifting may be in a horizontal or vertical direction, whereafter a next tube insertion is accomplished. In the case of such adjustment of the thrust assembly, it is unavoidable that after an insertion of a tube, the rear ends of the tube will still lie in the wedge of the rollers. In order to properly protect the tubes, the rollers must be provided with a relatively soft rubber or plastic overlay, which to be sure also causes a slight shock absorbing effect for the rear ends of the tube but which however will not be sufficient to cause rejection of the tubes. In view of the positive engagement and roller means provided for controlled insertion of the tube, the overlay must not be of such dimensions to completely eject the rear ends of the tube from the wedge between the rollers.

Often during operation, damage of the roller overlays may be caused by the rear end of the tube of the previously inserted tubes whereby the damage is noted already in the case of an adjustment of the thrust assembly which occures in the longitudinal direction of the rollers.

In order to prevent the danger of such damage of the roller overlay and in order to make possible also an adjustment of the thrust assembly in a direction perpendicular to the longitudinal extent of the roller mechanism, the mounting apparatus according to the invention has an adjustable guide piece with guide channels for the tubes these channels being made adjustable by arresting means and the guide piece disposed in the thrust assembly so as to be shiftable in the direction of the pair of rollers whereby the terminal section of said guide piece facing the pair of rollers has a height equal to the diameter of the tubes. This terminal section carries an automatic control that may be swung up by the tubes that pass through. The automatic control lies in front of its outlet end and which is insertable between the rollers as a residual thrust striker. The residual thrust striker may be a ram, plunger or rammer.

In the case of a standard insertion, the guide piece is arrested in the thrust assembly. In the case of the preparatory insertion of the tubes provided with the centering points in the direction up to the rollers, the projecting conical centering point swivels the automatic control and locking device upwardly whereby the control is held high by the tubes that pass through and then the control is automatically swung down or lowered after passage of the last tube. As soon as the tubes have completely passed through the pair of rollers, the arresting means for the guide piece is released and the guide piece with the automatic control in front is inserted into the wedge of the rollers, whereupon the pair of rollers presses the automatic control now lying in front of the guide piece, against the rear ends of the tubes and executes a residual thrust on the tubes, as a result of which the latter are completely guided out of the wedge of the rollers.

According to the invention, an adjustable stop is provided to limit the residual thrust path of the guide piece which is disposed on the housing of the thrust aggregate. With this stop the desired residual projecting length of the rear ends of the tube over the outside of the tube plate may be always fixed. As soon as the guide piece strikes the stop, the absorption of the permitted amperage of the roller driving motor rises beyond the adjusted maximum borderline value, so that the motor switches over to reverse and returns the guide piece of the apparatus automatically again into its basic position. In order to arrest the guide piece, an automatically catching or clicking stop arrangement is advantageously provided, for example, a spring charged bolt which engages with a receiving hole disposed on the guide piece.

Additional characteristics of the invention are found in the drawing following the description and the claims.

BRIEF DESCRIPTION OF THE DRAWINGS

The mounting arrangement of the invention will be described in more detail in the following paragraphs on the basis of preferred embodiment shown in the drawing by way of example.

FIG. 5 shows the guide piece of the thrust aggregate of the mounting arrangement and FIG. 6 shows a centering point to be inserted into the front end of the tube.

DESCRIPTION OF THE PREFERRED EMBODIMENT

Figure 1:
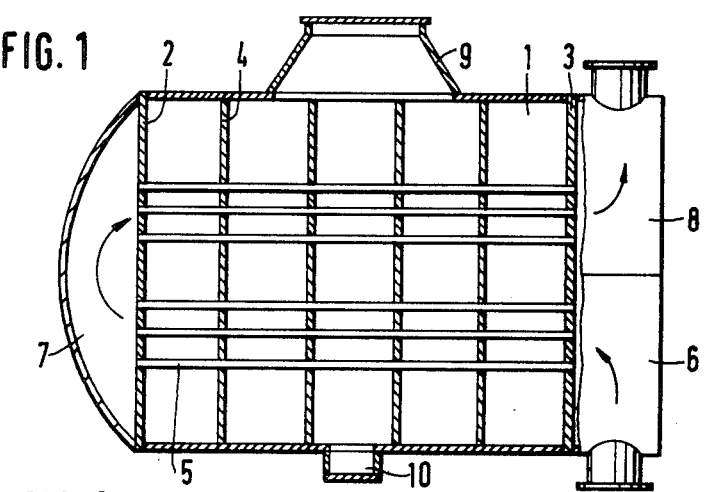
FIG. 1 shows in a simplified presentation a condenser with tubes.

FIG. 1 shows a condenser with a heat exchange chamber 1 which is limited on the front side by the perforated tube plates 2 and 3. In the tube plates 2 and 3 and into correspondingly perforated supporting walls 4 there are inserted a large number of continuous tubes 5. After mounting the tubes 5, the coolant spaces 6, 7 and 8 are provided on the outside edges of the tube plates 2 and 3. FIG. 1 further shows the steam inlet 9 and the outlet 10 for the condensate which results by the cooling action of coolant in the tubes.

Figure 2:
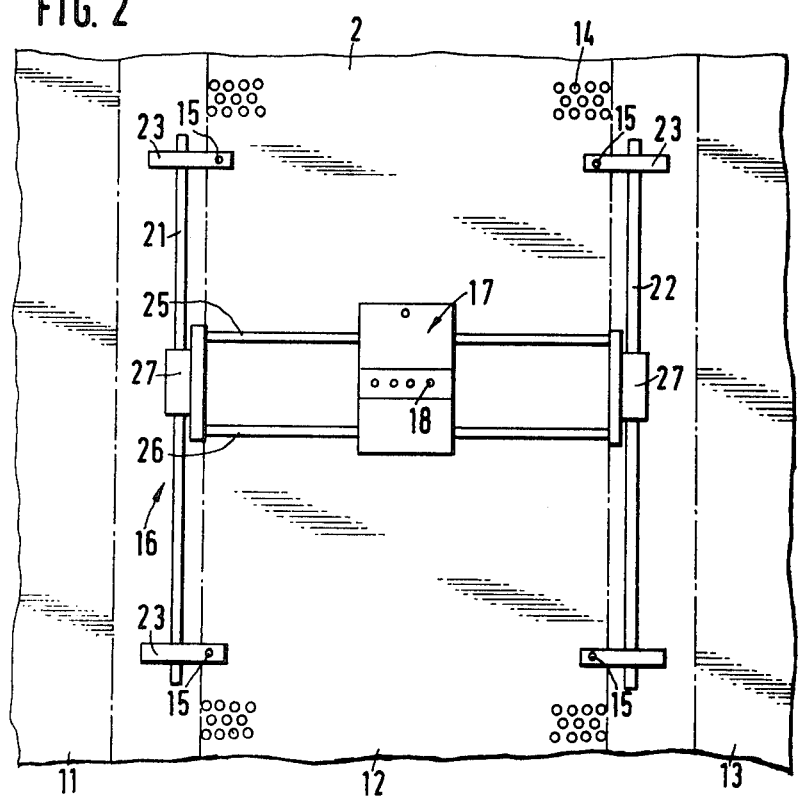
FIG. 2 shows in a greatly simplified total view, a mounting arrangement fixed on empty holes of a condenser perforated plate.

FIG. 2 shows a small section of the tube plate 2 which has many perforation fields designated by reference numerals 11, 12 and 13 all with with numerous holes 14 shown at the top and disposed closely side by side. On four empty holes 15 which are at the bottom and which are not yet equipped with tubes, a cross slide arrangement 16 is fixed, which bears a thrust assembly 17 adjustable in both the horizontal and the vertical direction. The thrust assembly in FIG. 2 has four guide channels 18 for the tubes that are to be inserted and aligned with the holes 14 of the perforated plate 2, and is further provided with one pair of rolls 19, 20, for the advancing of the tubes, see FIG. 3.

Figure 3:
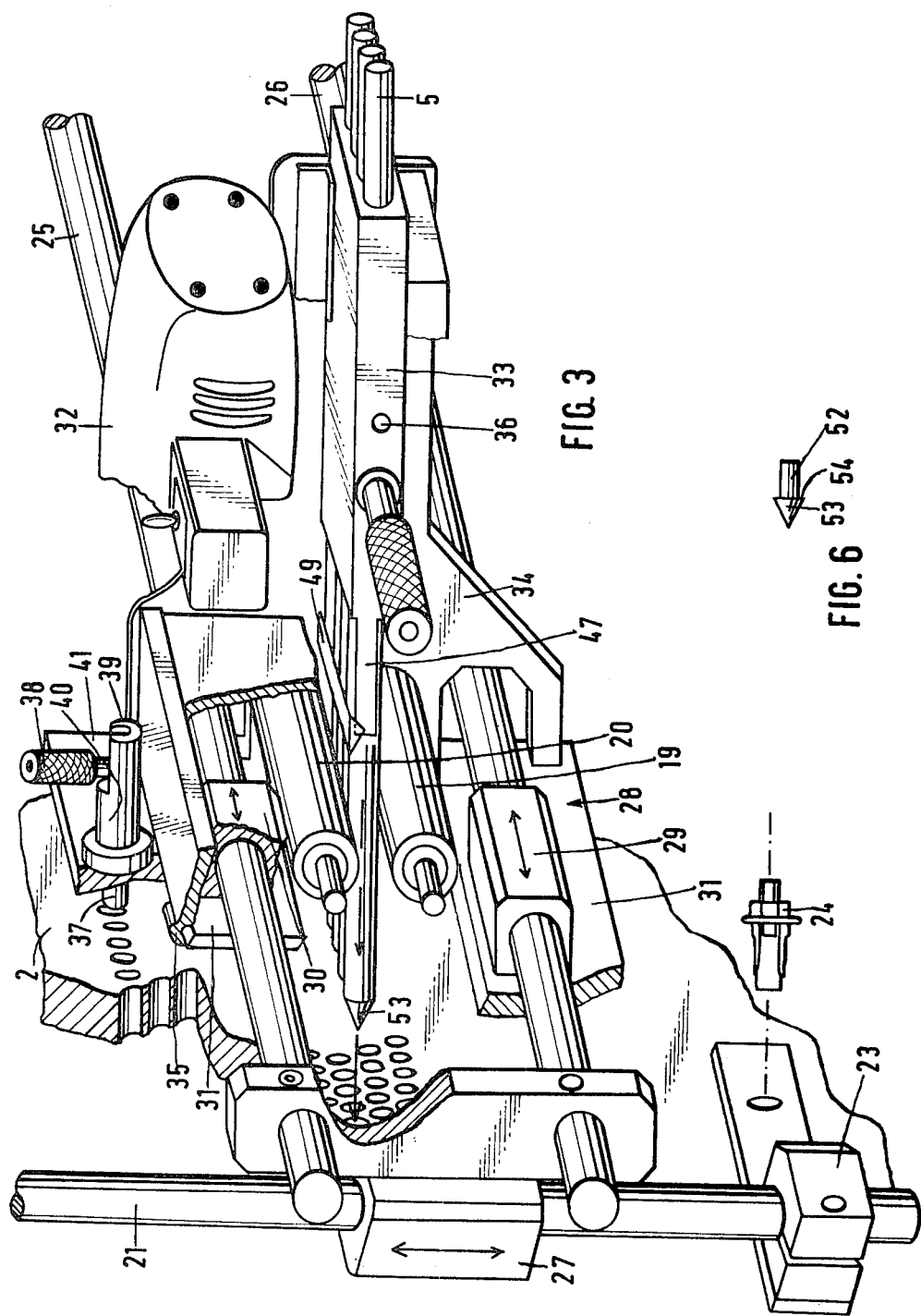
FIG. 3 shows a perspective view of the mounting arrangement with the front parts of the housing broken away.

As shown in FIGS. 2 and 3 the cross slide arrangement 16 has two vertical, parallel guide rods 21 and 22 provided with clamp dogs 23 at the ends, which are fixed by expanding mandrel 24 at the empty holes 15 of the tube plate 2. The cross slide arrangement 16 furthermore comprises two horizontal guide bars 25 and 26 disposed one on top of the other, which are attached at the end on bushing 27 and can be shiftably moved on the vertical guide rods 21 and 22. Vertical guide rods 21 and 22 have bushings 29 and 30 attached to the housing 28 of the thrust assembly 17.

The housing 28 of the thrust assembly 17 consists of a plateshaped frame 31 fitted with bushings 29 and 30 with the frame 31 lying between the tube plate 2 and the horizontal guide rods 25, 26. Housing 28 further includes a housing part 34 bearing the pair of rollers 19 and 20. For drawing the rollers 19 and 20 there is provided a multistage driving motor 32 for the pair of rollers 19 and 20 and a guide piece 33 serves for the tubes 5 that are to be inserted. The housing part 34 is suspended by means of hook-like projections 35 from the frame 31 as shown in FIG. 3.

Figure 4:
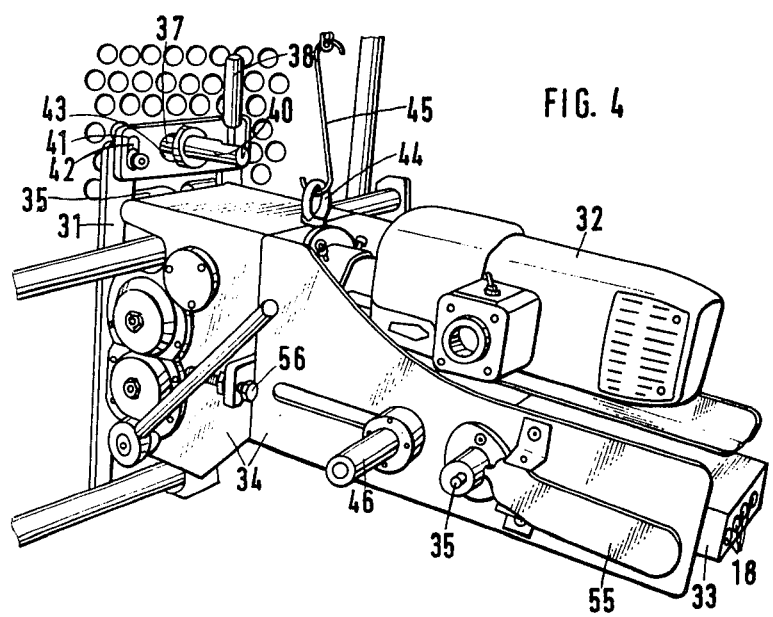
FIG. 4 shows a perspective outside view analogous to FIG. 3.

The guide piece 33 in its base position is shown in the FIGS. 3 and 4 and is arrested on the housing 34 of the thrust assembly 17 by means of a spring-charged bolt 35 which engages with a receiving hole 36 of the guide piece. The guide channels 18 for the tubes are aligned right through the spacing between the rollers and alignment is with a certain group of holes in the tube plate 2. At the same time, the alignment is secured by means of a positioning bolt 37 which is mounted shiftably in the frame 31. The bolt 37 is plugged into a hole of a higher row of holes or the bolt 37 may be held by a spring (not shown) in engagement with such a hole. The bolt 37 may be pulled back via a handle 38 and may be arrested or stopped in the pulled back position by means of the swivelling movement of the handle 38 across the front surface 39 of the bolt guiding bushing 40, whenever the thrust assembly is to be moved on the cross slide arrangement.

Whereas in the embodiment of the simplified presentation according to FIG. 3, we started out from the fact that the distance in height between the positioning bolt 37 and the guide channels 18 for the tubes in the guide piece 33 makes up exactly a multiple of the intervals between the rows of holes in the case of the tube plate 2, the positioning bolt 37 in FIG. 4 shows a different situation, and bolt 37 has been disposed on a plate 41 which has been provided with oblong holes 42 directed vertically and arranged so that it may be attached to the housing frame 31 adjustable as to height. The positioning bolt 37 furthermore is adjustable on the plate 41 in the horizontal direction which is indicated in a simplified manner by an elongated hole 43 in the plate 41.

FIG. 4 shows also an eye 44 attached to the housing 34 in order to connect a suspending S-hook 45 through which the thrust aggregate is hung suspended from a suspending arrangement (not shown).

Figure 5:
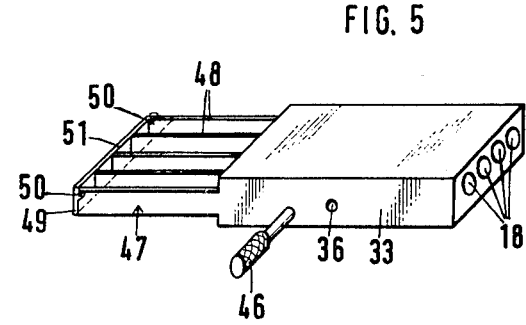

FIG. 5 illustrates a guide piece 33, which on its rear is about twice as high as the diameter of the guide channels 18 for the tubes and has a laterally projecting handle 46. At the terminal section 47 facing the pair of rolls, the guide piece 33 has a height which is about equal to the diameter of the guide channels 18 for the tubes, so that the guide piece there only consists of narrow prongs 48 framing and enclosing the inserted tubes laterally. The prongs 48 lie at the same level as the channels 18 for the inserted tubes. At the front ends of the two outside prongs 48, a locking device 49 has been swivelably mounted around the axes 50 of the joint which lie close to the upper edge of the prongs 48. The locking device 49 consists essentially of a plate 51 lying in the position accoring to FIG. 5 in front of the front ends of the prongs 48, the height of which plate is equal to the height of the prongs 48.

OPERATION

The operation of the apparatus is as follows. A corresponding number of tubes 5 is inserted into the channels 18 of the guide piece 33 arrested on the housing 34. Prior to that, centering points 52 are plugged into the front ends of the tubes which —cf. FIG. 6 —have a conical point 53, are seated on the advancing end of the tube with an annular shoulder 54 corresponding to the thickness of the tube wall. When pushing the first tube through, the locking device 49 is already swivelled up by the point 53 striking it below its swivel bearing. Prior to the first insertion process, the adjustably disposed rolls 19, 20 are effectively aerated considerably and the tubes are pushed right up to the tube plate 2. In the case of the positioning bolt 37 being pulled back, the thrust assembly is shifted in such a way on the horizontal and vertical guide rods until the tubes are aligned precisely with the holes of the tube plate. Subsequently, the positioning bolt 37 is adjusted in relation to the frame 31 in such a way that it may likewise be plugged into a hole of the tube plate, whereupon the guide bushing 40 is clamped down on the bearing plate 41 and the latter on the housing frame 31. Subsequently, the pair of rolls is brought into engagement with the tubes 5 and the motor is switched on, whereupon the tubes are now pushed forward by machine right through the perforated supporting walls in the condenser chamber up to the opposite tube plate.

The advancing power generated in this case by the electrical motor, is monitored by a control arrangement adjustable continuously to a maximum borderline value and monitoring the absorption of amperes of the motor. If a tube upon passage through a hole, which for example has not been processed neatly, should result in furrows or grooves, this would lead to an increase of the advancing force that is to be generated by the motor. In the case of exceeding an adjusted borderline value, the control arrangement switches the driving motor automatically into reverse, so that the mechanic will take notice of such a condition and will be advised of the fault.

If no such interruption or interference takes place, then the pair of rolls will advance the tube 5 up to a point where it loses its contact with the tubes, after which however, the rear ends of the tubes 5 still lie in the wedge of the pair of rolls. After passage of the tubes 5, it is true, the locking device 49 in the meantime has dropped at the guide piece 33 in front of the prongs 48. Now the arresting bolt 35 is pulled out of the guide piece 33 via a lever 55 and the guide piece is advanced by way of its handle 46 up to a point, where the locking device 49 or the prongs 48 are seized by the pair of rolls 19, 20 after which now the locking device 49 is pressed by the rolls against the rear ends of the tubes. An adjustable stop 56 developed as a screw bolt, is disposed outside on the housing 34 of the thrust aggregate, which stop lies in the path of movement of the handle 46. As soon as the handle 46 abuts against the stop 56, the reception of amperes of the driving motor exceeds the adjusted border value so that the control arrangement switches the motor over to reverse, as a result of which the guide piece 33 returns into its basic position in which it is caught and held by its clicking stop bolt 35.

For a subsequent process of the insertion of tubes, the positioning bolt 37 is pulled back with the handle 38 and the inserting aggregate is shifted either by four holes in the tube plate toward the side or by the distance of one hole of the tube plate upwards on the guide rods after which the positioning bolt 37 is inserted into the corresponding hole. Now just as in the case of all further inserting processes, the adjustment of the thrust aggregate has been aligned precisely for a next insertion of tubes in view of the regular distribution of the holes in the tube plates. The mechanic now inserts the new tubes only up to the engagement on the pair of rolls 19, 20 and then turns on the motor.

Having thus disclosed the invention, I claim:

1. Mounting apparatus for inserting tubes into holes of perforated supporting plates of large heat exchangers, such as cooling condensers in power plants, comprising:
   a cross slide arrangement (16) directly mountable on one of said tube supporting plates (2) and extending over a plurality of holes in said supporting plate;
   a thrust assembly (17) mounted on said cross slide arrangement (16) being shiftable along said plurality of holes;
   said thrust assembly (17) being provided with one or more parallel guide channels (18) which are alignable with the holes in said tube plates for guiding the tubes that are to be inserted by an electric motor-driven pair of rollers that are attached to said thrust assembly (17) for the advancing of the tubes;

said thrust assembly (17) comprising a guide piece (33) which is disposed in said thrust assembly (17) and is shiftable in the direction of the pair of rollers (19,20);

said guide piece (33) having the said guide channels (18) for the tubes being mounted with the terminal section (47) facing the pair of rollers (19,20);

said guide piece (33) having a height which is equal to the diameter of the tubes;

a swivelable locking device (49) mounted on said guide piece (33) that can be swivelled up by the tubes passing through and lying in front of its outlet end whereby said locking device (49) may be inserted between the rollers as a residual thrust rammer; and control means to prevent the driven rollers from scoring the tubes inserted by changing, slowing or reversing the driving of the rollers.

2. Apparatus as claimed in claim 1 wherein said control means comprises a control arrangement monitoring the amperage of the driving electric motor (32) for the rollers, said control arrangment including adjusting means which is adjustable continuously to a maximum borderline value and a switch means which switches the driving motor into reverse in the event the borderline value is exceeded.

3. Apparatus as claimed in claim 1 including centering points (52) corresponding to the advancing ends of the tubes which are insertable into the advancing ends of the tubes (5), said centering points having a conical point (53) which projects from the ends of the tubes.

4. Apparatus as claimed in claim 3 comprising an adjustable stop means (56) for the limitation of the terminal thrust path of the guide piece (33), said adjustable stop being mounted on the housing (28) of said thrust assembly (17).

5. Apparatus as claimed in claim 1 wherein said arrangement of the cross slide (16) is provided with two vertical guide rods (21,22) fitted with claim dogs (23) at their terminal sides, said dogs being fixed by means of expanding mandrels (24) in empty holes (15) of the tube plate (2) and said arrangement further including two horizontal guide rods (25,26) arranged one on top of the other which are attached at their ends on bushings (27) shiftable on the vertical guide rods and which have further bushings (29,30) attached to the housing (28) of the thrust assembly assembly (17).

6. Apparatus as claimed in claim 5 comprising a housing (28) for the thrust assembly (17) consisting of a frame (31) lying between the tube plate (2) and the horizontal guide rods (25,26) and having the bushings (29,30) including a housing part (34) supporting said pair of rollers (19,20), said driving motor (32) and said guide piece (33), said housing part for supporting the aforesaid members being suspended from the frame (31) by means of hooklike projections (35).

7. Apparatus as claimed in claim 6 comprising a positioning bolt (37) insertable into an empty hole of the tube plate, said bolt being mounted on the housing (28) of the thrust assembly.

8. Apparatus as claimed in claim 7 wherein said positioning bolt (37) penetrates a horizontally directed oblong hole (43) in a plate (41) which is attached to the frame and is adjustable in a vertical direction.

* * * * *